(12) United States Patent
Paley et al.

(10) Patent No.: US 11,494,107 B2
(45) Date of Patent: *Nov. 8, 2022

(54) MANAGING PARITY INFORMATION FOR DATA STORED ON A STORAGE DEVICE

(71) Applicant: Apple Inc., Cupertino, CA (US)

(72) Inventors: Alexander Paley, San Jose, CA (US); Andrew W. Vogan, Austin, TX (US); Evgeny Televitckiy, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/381,969

(22) Filed: Apr. 11, 2019

(65) Prior Publication Data
US 2020/0326857 A1 Oct. 15, 2020

(51) Int. Cl.
*G06F 11/00* (2006.01)
*G06F 3/06* (2006.01)
*G06F 11/07* (2006.01)
*G06F 11/10* (2006.01)

(52) U.S. Cl.
CPC ............ *G06F 3/065* (2013.01); *G06F 3/0619* (2013.01); *G06F 3/0679* (2013.01); *G06F 11/0793* (2013.01); *G06F 11/108* (2013.01)

(58) Field of Classification Search
CPC .... G06F 3/065; G06F 3/0679; G06F 11/0793; G06F 3/0619; G06F 11/108; G06F 11/1076; G06F 3/0665; G06F 3/0688; G06F 3/061; G06F 3/0673; G06F 3/0644

USPC ................................ 714/758, 763, 770, 773
See application file for complete search history.

(56) References Cited

U.S. PATENT DOCUMENTS

| | | | |
|---|---|---|---|
| 9,009,565 B1 * | 4/2015 | Northcott | G06F 11/1012 714/763 |
| 9,021,336 B1 | 4/2015 | Northcott | |
| 9,021,339 B2 | 4/2015 | Lu et al. | |
| 9,026,867 B1 | 5/2015 | Northcott et al. | |
| 9,058,116 B2 | 6/2015 | Colgrove et al. | |
| 9,361,036 B2 * | 6/2016 | Vogan | G06F 11/1048 |
| 2008/0256183 A1 * | 10/2008 | Flynn | G06F 13/28 711/E12.04 |
| 2009/0113235 A1 * | 4/2009 | Selinger | G06F 11/108 711/E12.001 |

(Continued)

*Primary Examiner* — Albert Decady
*Assistant Examiner* — Osman M Alshack
(74) *Attorney, Agent, or Firm* — Dickinson Wright RLLP

(57) ABSTRACT

Disclosed herein are techniques for managing parity information for data stored on a storage device. A method includes (1) receiving a request to store data into the storage device, (2) storing portions of the data in data pages included in stripes in a band of the storage device, where a respective data page is stored on a respective different die of a respective stripe, (3) determining primary parity information for a first stripe including a subset of the data pages, (4) storing the primary parity information in a primary parity page included in a second stripe in the stripes in the band, where the primary parity page is disposed on a next available die relative to dies storing the data pages, (5) determining secondary parity information for the second stripe, and (6) storing the secondary parity information in a secondary parity page included in the stripes in the band.

18 Claims, 15 Drawing Sheets

Example Step 1 – Initial state of band layout including different sets of user data and parity data.

(56) References Cited

U.S. PATENT DOCUMENTS

| | | | |
|---|---|---|---|
| 2013/0031300 A1* | 1/2013 | Seo | G06F 12/0246 |
| | | | 711/E12.008 |
| 2015/0301896 A1* | 10/2015 | Aliev | G06F 11/1096 |
| | | | 714/6.24 |
| 2016/0196065 A1* | 7/2016 | Ojalvo | G06F 3/061 |
| | | | 711/114 |
| 2016/0306574 A1* | 10/2016 | Friedman | G06F 11/00 |
| 2016/0335198 A1* | 11/2016 | Vogan | G06F 12/128 |
| 2018/0129430 A1* | 5/2018 | Kang | H03M 13/2757 |
| 2019/0012236 A1* | 1/2019 | Hitron | G06F 11/1076 |
| 2019/0146906 A1* | 5/2019 | Gholamipour | G06F 3/0689 |
| | | | 711/103 |
| 2019/0377633 A1* | 12/2019 | Perlmutter | G06F 11/1012 |
| 2020/0210282 A1* | 7/2020 | Cariello | G06F 3/0619 |

\* cited by examiner

Example Step 2 – Failure at Die #1 causes a loss of the following:

(1) – Data Pages ($D1_1$, $D2_1$, $D3_1$, $D4_1$, $D6_1$, $D7_1$)
(2) – Primary Parity Pages (P2, P7)
(3) – Secondary Parity Page (QB1, QB4)

Example Step 3 – Recover Primary Parity Page P2 using Secondary Parity Page QA2, QA1 and Primary Parity Pages P3, P4.

Example Step 4 – Recover Secondary Parity Page QB4 using Secondary Parity Page QA4.
Recover Primary Parity Page P7 using Secondary Parity Page QB4, QA4, QA3, QB3.

Example Step 7 – Recover Data Page $D3_1$ using Primary Parity Page P3 and Data Pages $D3_2, D3_3, D3_4$.

Example Step 8 – Recover Data Page $D4_1$ using Primary Parity Page P4 and Data Pages $D4_2$, $D4_3$, $D4_4$.

Example Step 9 – Recover Data Page $D6_1$ using Primary Parity Page P6 and Data Pages $D6_2$, $D6_3$, $D6_4$.

Example Step 10 – Recover Data Page D7₁ using Primary Parity Page P7 and Data Page D7₂ and Primary Parity Pages P5 and P6.

MANAGING PARITY INFORMATION FOR DATA STORED ON A STORAGE DEVICE

FIELD

The described embodiments set forth techniques for establishing redundancy-based protection for data stored on a storage device. In particular, the techniques involve managing parity information for the data in a manner that enables redundancy-based protection to be established within the storage device. The redundancy-based protection may be established without hindering performance of the storage device by storing the parity information in a deterministic location that creates a cohesive unity between the data and the parity information.

BACKGROUND

Solid state drives (SSDs) are a type of mass storage device that share a similar footprint with (and provide similar functionality as) traditional magnetic-based hard disk drives (HDDs). Notably, standard SSDs—which utilize "flash" memory—can provide various advantages over standard HDDs, such as considerably faster Input/Output (I/O) performance. For example, average I/O latency speeds provided by SSDs typically outperform those of HDDs because the I/O latency speeds of SSDs are less-affected when data is fragmented across the memory sectors of SSDs. This occurs because HDDs include a read head component that must be relocated each time data is read/written, which produces a latency bottleneck as the average contiguity of written data is reduced over time. Moreover, when fragmentation occurs within HDDs, it becomes necessary to perform resource-expensive defragmentation operations to improve or restore performance. In contrast, SSDs, which are not bridled by read head components, can largely maintain I/O performance even as data fragmentation levels increase. SSDs also provide the benefit of increased impact tolerance (as there are no moving parts), and, in general, virtually limitless form factor potential. These advantages—combined with the increased availability of SSDs at consumer-affordable prices—make SSDs a preferable choice for mobile devices such as laptops, tablets, and smart phones.

Despite the foregoing benefits provided by SSDs, some drawbacks remain that have yet to be addressed, especially with respect to establishing redundancy-based protection within SSDs. For example, conventional techniques for implementing redundancy-based protection within a given SSD involve writing data (e.g., a user file) across different dies of the SSD, and interleaving parity information for the data within the data itself across the different dies. Unfortunately, this approach establishes a pitfall in which the data becomes unrecoverable when a single die of SSD fails, which is not uncommon. In particular, a single die failure often leads to the loss of both data and its corresponding parity data, thereby thwarting potential recovery scenarios. Notably, the conventional approaches that attempt to alleviate this problem typically come at the cost of significant performance/flexibility reduction and increased storage space consumption, which is undesirable for obvious reasons. Therefore, there exists a need for a technique for improving the overall redundancy-based protection characteristics of a given SSD without requiring significant performance and storage space sacrifices.

SUMMARY

The described embodiments set forth techniques for managing parity information for data stored on a storage device to provide improved redundancy-based protection characteristics without sacrificing the overall performance of the storage device.

One embodiment sets forth a method for managing parity information for data stored on a storage device. According to some embodiments, the method includes the steps of (1) receiving a request to store data into the storage device, (2) storing respective portions of the data in a plurality of data pages included in a plurality of stripes in a band of the storage device, where a respective data page is stored on a respective different die of a respective stripe of the plurality of stripes, (3) determining primary parity information for a first stripe including a subset of the plurality of data pages calculating primary parity information for the first stripe, (4) storing the primary parity information in a primary parity page included in a second stripe in the plurality of stripes in the band, where the primary parity page is disposed on a next available die relative to dies storing the plurality of data pages in the plurality of stripes in the band, (5) determining secondary parity information for the second stripe including the primary parity page storing the primary parity information, and (6) storing the secondary parity information in a secondary parity page included in the plurality of stripes in the band.

According to some embodiments, the second stripe includes a second subset of the plurality of data pages and the primary parity page, and each of the second subset of the plurality of data pages and the primary parity page is stored on a respective different die of the storage device. Also, in some embodiments, the secondary parity page is disposed on another next available die relative to the next available die storing the primary parity page in the plurality of stripes. Also, in some embodiments, a copy of the secondary parity page is written into a different secondary parity page included in the plurality of stripes in the band, where the different secondary parity page is stored on a different die than the respective die on which the secondary parity page is stored. In some embodiments, the next available die at which to store the primary parity page can be determined based on a number of the plurality of data pages that are storing the respective portions of the data. In some embodiments, second primary parity information can be calculated for a third stripe of the plurality of stripes, where the third stripe includes a second subset of the plurality of data pages, and the second primary parity information can be written into a second primary parity page included in the plurality of stripes in the band, wherein the second primary parity page is disposed on another next available die relative to the next available die storing the primary parity page in the plurality of stripes.

In some embodiments, a second request to store second data into the storage device can be received, a data storage size can be determined for second data pages for the second data, second primary parity pages for the second data pages, and second secondary parity pages for the second primary parity pages, and second secondary parity page copies for the second secondary parity pages, a second size of available space in the band of the storage device can be determined, responsive to determining that the data storage size is less than or equal to the second size, the second data pages, the second primary pages, the second secondary parity pages, and the second secondary parity page copies can be stored in the band, and responsive to determining that the size exceeds the second size, the second data pages, the second primary pages, the second secondary parity pages, and the second secondary parity page copies can be stored in a second band of the storage device.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that can be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
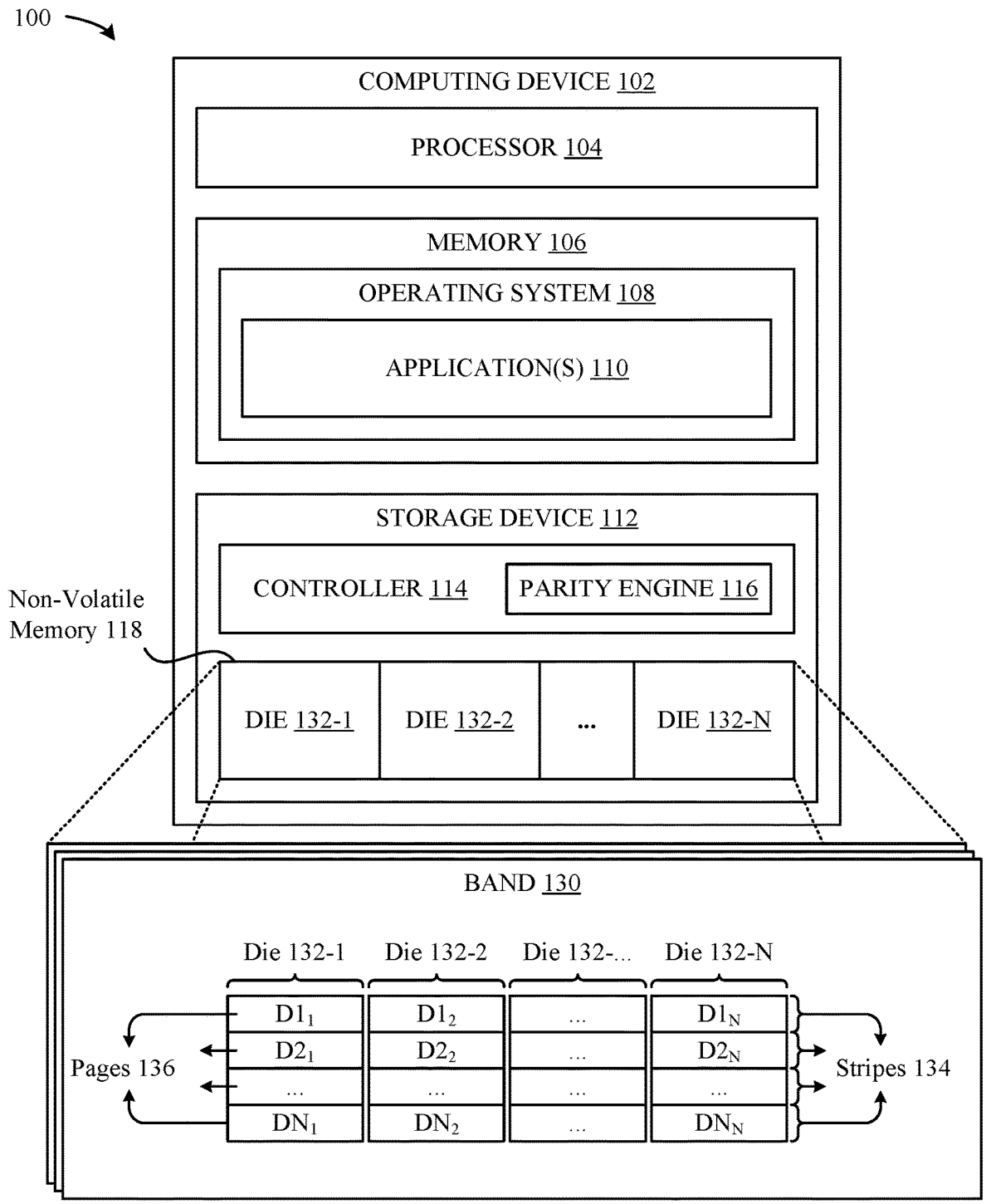
FIG. 1 illustrates a block diagram of different components of a system that is configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for managing parity information for data stored on a storage device to implement redundancy-based protection. According to some embodiments, the techniques can involve establishing different "bands" that span different dies of the storage device. In particular, each band can be horizontally separated into different "stripes." Moreover, each stripe can be vertically separated into different "pages," such that each page of a given stripe is disposed on a different one of the dies. In some examples, a band is a grouping of stripes each including pages disposed on different respective dies of a storage device. In some examples, a stripe is a horizontal grouping of pages each disposed on a different die. In some examples, a page is a single block of memory in a storage device and may be the smallest unit of data in the storage device. In some examples, a die is a block of semiconducting material on which an integrated circuit assembly is fabricated that is used to store data. The die may include a vertical grouping of pages stored on the integrated circuit assembly.

In some embodiments, a data object and primary parity information corresponding to the data object can be written across one or more pages/stripes of the same band. The primary parity information provides redundancy-based protection for the data object. Additionally, the techniques can involve establishing redundancy-based protection for the primary parity information by storing, within the same band that stores the data object and primary parity information, secondary parity information for the primary parity information. To establish redundancy-based protection for the secondary parity information, the techniques can further involve establishing a copy of the secondary parity information within the same band, where the copy of the secondary parity information is stored on a different die relative to the die on which the second party information is stored. Accordingly, given the data and the parity information (e.g., the primary parity information, the secondary parity information, and the copy of the secondary parity information) are stored in the same band, locating the parity information can be more efficient. For example, in some embodiments, the parity information can be appended to the data in the band to create a cohesive unity between the data and the parity information. In this manner, a location of the parity information can be determined based on a size of the pages/stripes storing the user data. Such a deterministic technique eliminates the need for a pointer to another band of the storage device to locate the parity information. Further, complicated translations between the parity information location and the data location can be avoided, thereby increasing performance of the storage device. Another advantage provided by the present disclosure can also include increased performance of the storage device by storing the parity information next to the corresponding user data within the same band as opposed to another band within the storage device. Accordingly, the present techniques can result in improved redundancy-based protection characteristics without sacrificing the overall performance of the storage device.

A more detailed discussion of these techniques is set forth below and described in conjunction with FIGS. 1, 2A-2M, and 3, which illustrate detailed diagrams of systems and methods that can be used to implement these techniques.

FIG. 1 illustrates a block diagram 100 of a computing device 102—e.g., a smart phone, a tablet, a laptop, a desktop, a server, etc.—that is configured to implement the various techniques described herein. As shown in FIG. 1, the computing device 102 can include a processor 104 that, in conjunction with a memory 106 (e.g., a dynamic random access memory (DRAM)) and a storage device 112 (e.g., a solid-state drive (SSD)), enables different software entities to execute on the computing device 102. For example, the processor 104 can be configured to load, from the storage device 112 into the memory 106, various components for an operating system (OS) 108. In turn, the OS 108 can enable the computing device 102 to provide a variety of useful functions, e.g., loading/executing various applications 110 (e.g., user applications). It should be understood that the computing device 102 illustrated in FIG. 1 is presented at a high level in the interest of simplification, and that a more detailed breakdown is provided below in conjunction with FIG. 5.

According to some embodiments, and as shown in FIG. 1, the storage device 112 can include a controller 114 that is configured to orchestrate the overall operation of the storage device 112. For example, the controller 114 can be configured to receive and process input/output (I/O) requests issued by the OS 108/applications 110 to the storage device 112. According to some embodiments, the controller 114 can include a parity engine 116 that enables the controller 114 to establish the various parity information (e.g., for user data) described herein. It is noted that the controller 114 can include additional entities that enable the implementation of the various techniques described herein. Is further noted that these entities can be combined or split into additional entities without departing from the scope of this disclosure. It is additionally noted that the various entities described herein can be implemented using software-based or hardware based approaches.

In any case, as shown in FIG. 1, the storage device 112 can include a non-volatile memory 118 (e.g., flash memory) that is composed of a collection of dies 132. According to some embodiments, and as shown in FIG. 1, a collection of bands 130 can be established within the non-volatile memory 118, where each band 130 spans the collection of dies 132. It is noted that one or more of the dies 132 can be reserved by the storage device 112—e.g., for overprovisioning-based techniques—without departing from the scope of this disclosure, such that a given band 130 can span a subset of the dies 132 that are available within the non-volatile memory 118. In this regard, the overall "width" of the band 130 is defined by the number of dies 132 that the band 130 spans. Continuing with this notion, the overall "height" of the band 130 is defined by a number of stripes 134 into which the band 130 is separated. According to some embodiments, and as shown in FIG. 1, each stripe 134 within the band 130 can be separated into a collection of pages 136 ($DN_M$), where each page 136 is disposed on a different die 132 of the non-volatile memory 118. In this regard, when the band 130 spans five different dies 132—and is composed of five different stripes 134—a total of twenty-five (25) pages 136 are included in the band 130, where each column of pages 136 is disposed on the same die 132. As described in greater detail herein, this organization enables user data and parity data to be stored within a same band in the non-volatile memory 118 in a manner that enables redundancy-based protection to be established without significantly impacting the overall performance of the storage device 112.

Accordingly, FIG. 1 provides high-level overview of the manner in which the computing device 102 can be configured to implement the techniques described herein. A more detailed explanation of these techniques will now be provided below in conjunction with FIGS. 2A-2L, and 5.

Figure 2A:
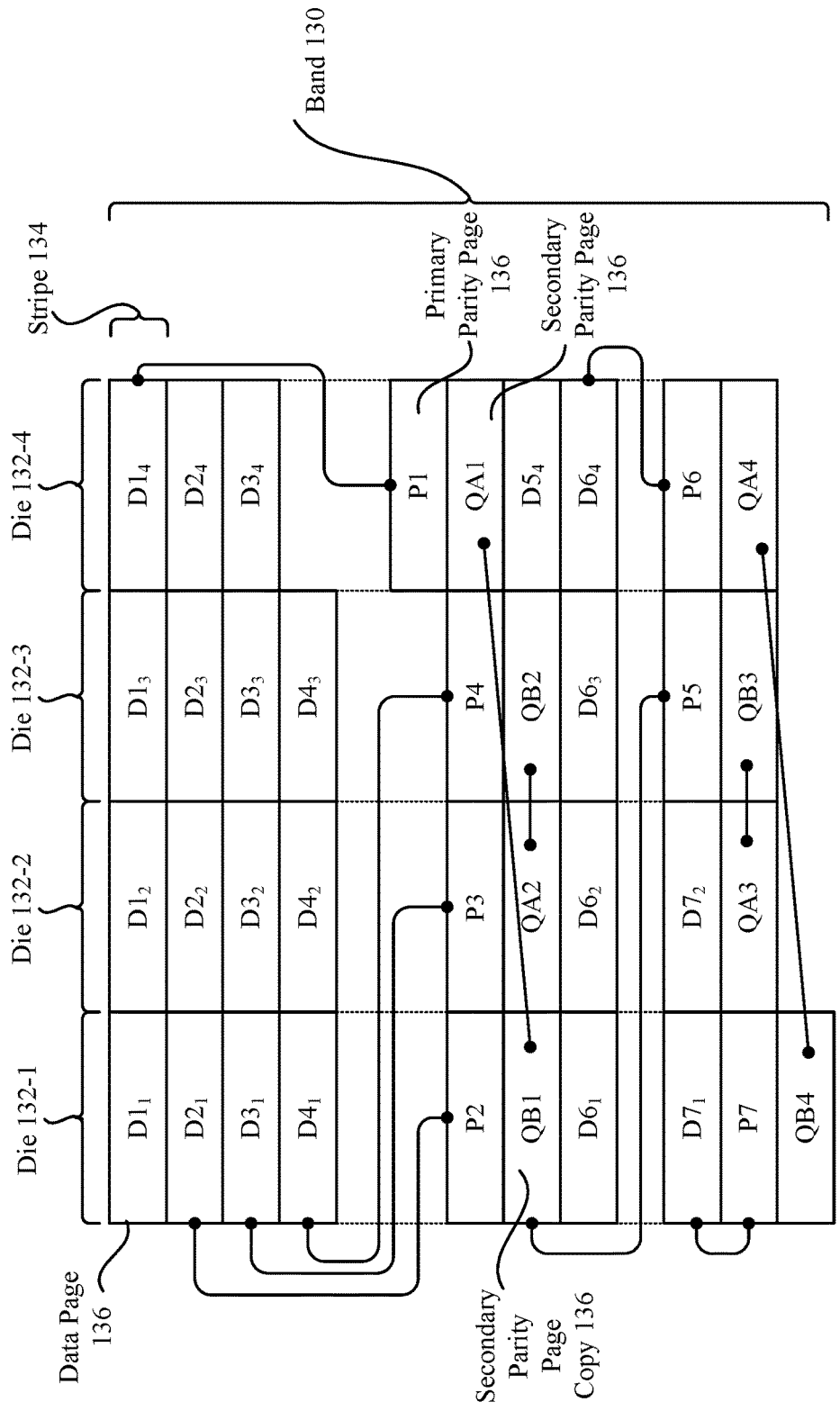
FIGS. 2A-2L illustrate conceptual diagrams of an example scenario in which a procedure is carried out to restore user data when a failure of a die occurs within a non-volatile memory of a storage device, according to some embodiments.

FIGS. 2A-2L illustrate conceptual diagrams of an example scenario in which a procedure is carried out to restore user data when a failure of a die 132 occurs within the non-volatile memory 118 of the storage device 112, according to some embodiments. It should be understood that the pages 136 of the storage device 112 are depicted as separated via the dashed lines in some of FIGS. 2A-2L to enhance clarity; however, the pages 136 are included in the same band 130, as described further below. As shown in FIG. 2A, a first step provides an example architectural layout of the non-volatile memory 118 to provide foundational support for the various techniques that are described in conjunction with FIGS. 2B-2L. In particular, the non-volatile memory 118 includes four dies 132: a die 132-1, a die 132-2, a die 132-3, and a die 132-4. Moreover, the non-volatile memory 118 includes a single band 130. As depicted, the band 130 stores two sets of user data and two sets of respective parity data. Each set of user data is stored in the non-volatile memory 118 with corresponding respective parity data appended thereto.

As described herein, a full stripe 134 of user data in the band 130 can refer to a stripe 134 including four different data pages 136 (e.g., $DN_1$, $DN_2$, $DN_3$, and $DN_4$, where N is the stripe number, and $1 \leq N \leq 5$), such that each data page 136 is stored on a respective different die 132 of the non-volatile memory 118. A full stripe 134 of parity data in the band 130 can refer to a stripe 134 including four different parity pages 136 (either primary parity page or secondary parity page), such that each parity page 136 is stored on a respective different die 132 of the non-volatile memory 118. A partial stripe 134 of user data in the band 130 can refer to a stripe 134 including one, two, or three different data pages 136, such that each data page 136 is stored on a respective different die 132 of the non-volatile memory 118. A partial stripe 134 of parity data in the band 130 can refer to a stripe 134 including one, two, or three different parity pages 136, such that each parity page 136 is stored on a respective different die 132 of the non-volatile memory 118. It should be understood that a partial stripe 134 of user data and a partial stripe 134 of parity data can be combined into a full stripe 134 of combined user data and parity data disposed on different respective die 132 of the non-volatile memory 118.

As depicted, a first set of user data in the band 130 includes three full stripes 134 of user data and one partial stripe 134 of user data. For example, a first full stripe 134 of user data in the first set of user data includes data pages $D1_1$, $D1_2$, $D1_3$, and $D1_4$ disposed on different dies 132-1, 132-2, 132-3, and 132-4, respectively. A second full stripe 134 of user data in the first set of user data includes $D2_1$, $D2_2$, $D2_3$, and $D2_4$ disposed on different dies 132-1, 132-2, 132-3, and 132-4, respectively. A third full stripe 134 of user data in the first set of user data includes $D3_1$, $D3_2$, $D3_3$, and $D3_4$ disposed on different dies 132-1, 132-2, 132-3, and 132-4, respectively. A partial stripe 134 of user data in the first set of user data includes three data pages $D4_1$, $D4_2$, and $D4_3$ disposed on different dies 132-1, 132-2, and 132-3, respectively.

Additionally, as shown in FIG. 2A, the band 130 can include a first set of parity data appended to the first set of user data. The first set of parity data can include a combination of primary parity pages 136 (e.g., P1, P2, P3, P4) and secondary parity pages 136 (e.g., QA1, QB1, QA2, and QB2) appended to the corresponding user data ($DN_1$-$D4_3$) in the first set of user data. As described in greater detail herein, a primary parity page 136 refers to parity information that directly corresponds to data pages 136, whereas a secondary parity page 136 refers to parity information that directly corresponds to primary parity pages 136.

As shown in FIG. 2A, each primary parity page 136 included in the band 130 can correspond to a respective stripe 134 storing user data. For example, the primary parity page 136 "P1" can correspond to the first stripe 134 of user data of the band 130, where the primary parity page 136 "P1" stores parity information that represents a parity calculation between each of the data pages 136 "$D1_1$", "$D1_2$", "$D1_3$", and "$D1_4$". In particular, the primary parity page 136 "P1" can represent a calculation of an exclusive disjunction (XOR) across each of the data pages 136 of the first stripe 134 of the user band 130. For example, when (1) the data page 136 "$D1_1$" has a value of "1111", (2) the data page 136 "$D1_2$" has a value of "1110", (3) the data page 136 "$D1_3$" has a value of (1100), and (4) the data page 136 "$D1_4$" has a value of (1000), the XOR of these data pages 136 can be calculated as follows:

$$\begin{aligned} 1111 \ XOR \ 1110 \ XOR \ 1100 \ XOR \ 1000 &= (((1111 \ XOR \ 1110) \ XOR \\ & \quad 1100) \ XOR \ 1000 \\ &= ((0001 \ XOR \ 1100) \ XOR \ 1000 \\ &= 1101 \ XOR \ 1000 \\ &= 0101. \end{aligned}$$

It is noted that the foregoing parity calculation is exemplary and that any form of parity calculation can be implemented without departing from the scope of this disclosure. In any case, returning now to FIG. 2A, it is noted that each secondary parity page 136 included in the first set of parity data in the band 130 can correspond to a respective stripe 134 of the band 130 in the first set of parity data that includes one or more primary parity pages 136. For example, the secondary parity page 136 "QA1" can correspond to the partial stripe 134 of parity data of the band 130 including primary parity page 136 "P1". As depicted, the partial stripe 134 of parity data including primary parity page 136 "P1" is appended to partial stripe 134 of user data including data pages 136 "$D4_1$", "$D4_2$", and "$D4_3$" in the same band 130. The secondary parity page 136 "QA1" stores parity information that represents a parity calculation between each of the primary parity page 136 "P1" and the data pages 136 "$D4_1$", "$D4_2$", and "$D4_3$". In particular, the secondary parity page 136 "QA1" can represent a calculation of an exclusive disjunction (XOR) across each of the primary parity page 136 "P1" and the data pages "$D4_1$", "$D4_2$", and "$D4_3$". Additionally, as shown in FIG. 2A, there exists a copy for each secondary parity page 136 stored in the first set of parity data in the band 130. For example, for the secondary parity page 136 "QA1", there exists a secondary parity page 136 "QB1" that is a copy of the secondary parity page 136 "QA1". In another example, for the secondary parity page 136 "QA2", there exists a secondary parity page 136 "QB2" that is a copy of the secondary parity page 136 "QA2". As described in greater detail below, the copies of the secondary parity pages 136 enable recovery procedures to be carried out even when a total failure of an individual die 132 occurs, thereby providing robust recovery performance.

Further, as depicted, the second set of user data and corresponding parity data is also stored in the same band 130 as the first set of user data and corresponding parity data. Prior to storing the second set of user data and respective parity data into the band 130, a determination can be made whether a data storage size of the second set of user data and respective parity data can be accommodated by available space in the band 130. A band 130 can be limited by the number of stripes/pages allocated to the band 130. In the depicted example, the data storage size of a set of user data and corresponding parity data can be determined by first determining a number of stripes 134 that will be used to store the user data. In the depicted example, three stripes 134 are used to store the second set of user data. For example, a first partial stripe 134 of user data including data page 136 "$D5_4$", a full stripe 134 of user data including data pages 136 "$D6_1$", "$D6_2$", "$D6_3$", and "$D6_4$", and a second partial stripe 134 of user data including data page 136 "$D6_1$". Thus, three primary parity pages 136 to store primary parity information for the three stripes of user data can be added to the data storage size of the second set of user data and respective parity data. Further, a determination of the number of stripes 134 used to store the primary parity pages 136 can be made. In the depicted example, two partial stripes 134 of parity data are used to store primary parity pages "P5", "P6", and "P7". Since a secondary parity page 136 and a copy of the secondary parity page 136 are used for each stripe 134 storing primary parity pages 136, two secondary parity pages 136 and two copies of secondary parity pages 136 can be added to the size of the second set of user data and corresponding parity data.

In the depicted example, the data storage size can be four stripes including fourteen pages (seven data pages 136, three primary parity pages 136, two secondary parity pages 136, and two copies of secondary parity pages 136). A determination can be made whether the size of the second set of user data and corresponding parity data can be accommodated by available stripes/pages remaining in the band 130 after storing the first set of user data and corresponding parity data. As depicted, responsive to determining that the size of the available stripes/pages can accommodate the size of the second user data and corresponding parity data, the second set of user data and parity data are stored in the same band 130 as the first set of user data and parity data. Any number of sets of user data and corresponding parity data can be stored in the band 130 assuming that the data storage size can be accommodated by the available stripes/pages in the band 130.

In some embodiments, responsive to determining that the size of the available stripes/pages cannot accommodate the size of the second set of user data and corresponding parity data, the second set of user data and corresponding parity data can be stored in another band 130 of the non-volatile memory 118. The user data and the parity data cannot be separated and stored in different bands 130. Embodiments of the present disclosure maintain the parity data appended to the user data within a same band 130. Such a technique can enable more efficient storage of the user data and the parity data next to each other. Further, the technique can enhance locating the parity data by determining an address at which the parity data is located based on the size of the user data without using a pointer or translations to locate the parity data.

Accordingly, FIG. 2A sets forth an example architectural layout of the non-volatile memory 118 to provide foundational support for the various techniques that are described in conjunction with FIGS. 2B-2L. It is noted that the breakdown of the non-volatile memory 118 illustrated in FIG. 2A is merely exemplary, and does not, in any manner, represent any limitations associated with the embodiments described herein. On the contrary, the non-volatile memory 118 can include any number of dies 132, bands 130, stripes 134, etc., without departing from the scope of this disclosure. In any case, FIGS. 2B-2L continue the example scenario illustrated in FIG. 2A, and involve performing a recovery procedure in response to a complete failure of the first die 132-1, which will now be described below in greater detail.

Figure 2B:
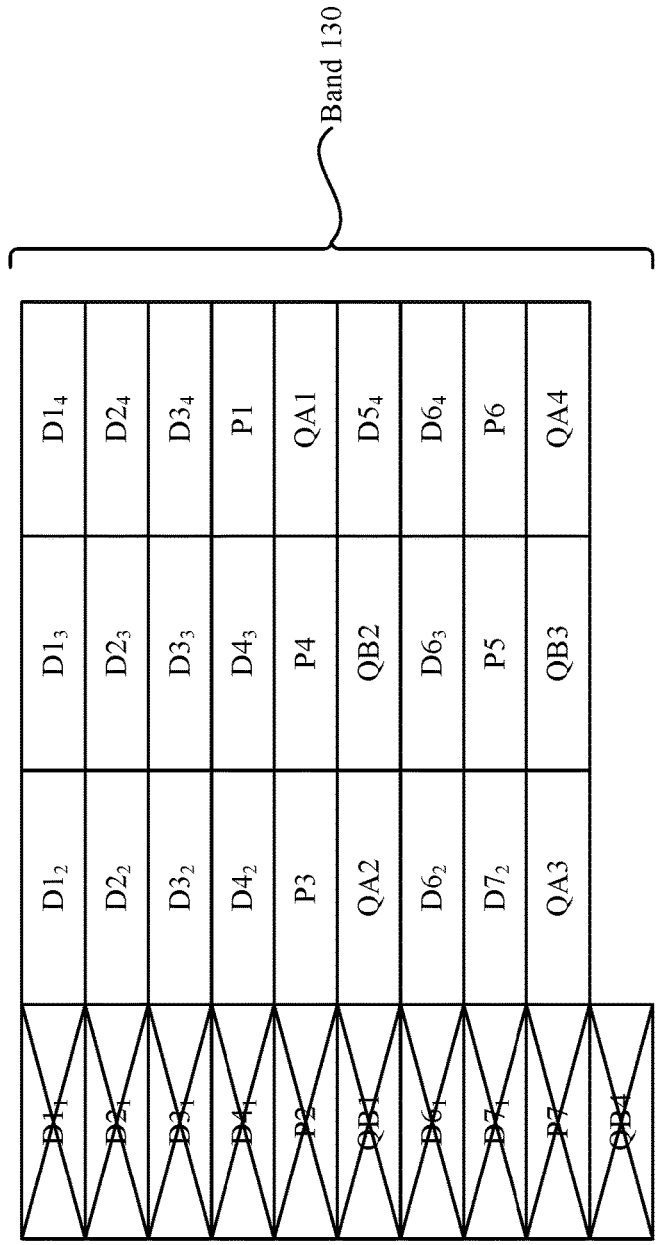

As shown in FIG. 2B, and as noted above, a second step involves a total failure of the die 132-1 within the non-volatile memory 118. This can occur, for example, due to aging components, physical damage, heat, and so on. In any case, as shown in FIG. 2B, the failure of the die 132-1 results in the loss of data pages 136 (e.g., $D1_1$, $D2_1$, $D3_1$, $D4_1$, $D6_1$, $D7_1$), primary parity pages (e.g., P2 and P7), and copies of secondary primary pages (e.g., QB1, QB4) from the first and second sets of user data and corresponding parity data stored on the stripes 134 in the band 130. At this juncture, it is desirable to carry out a recovery procedure in which the first data page 136 of each stripe 134 in first set of user data in the band 130 (i.e., $D1_1$, $D2_1$, $D3_1$, and $D4_1$) and in the second set of user data in the band 130 (i.e., $D6_1$, and $D7_1$) can be recovered so that no user data is lost. Fortunately, the band 130—specifically, the manner in which the primary parity information/secondary parity information is laid out within the parity band 130—enables such a recovery procedure to be carried out, which will now be described below in greater detail.

Notably, to properly recover each of the data pages 136 (i.e., $D1_1$, $D2_1$, $D3_1$, $D4_1$, $D6_1$, $D7_1$), each of the primary parity pages 136 (i.e., P1, P2, P3, P4, P6, and P7) should be intact. Primary parity page 136 "P5" cannot be used because "P5" provides parity information for the stripe 134 including data page 136 "$D5_4$", which is still available. As noted above, the primary parity pages 136 "P2" and "P7" are no longer available as a consequence of the failure of the die 132-1. Accordingly, a first portion of the recovery process can involve recovering the primary parity pages 136 "P2" and "P7" using the secondary parity information, which is described below in greater detail in conjunction with FIGS. 2C-2D. It is noted that this recovery process can be carried out in response to a variety of conditions being met, e.g., in response to detecting a failure of the die 132-1, in response to receiving a request to access any of the inaccessible data pages 136 ($D1_1$, $D2_1$, $D3_1$, $D4_1$, $D5_1$, $D6_1$, $D7_1$), and so on.

Figure 2C:
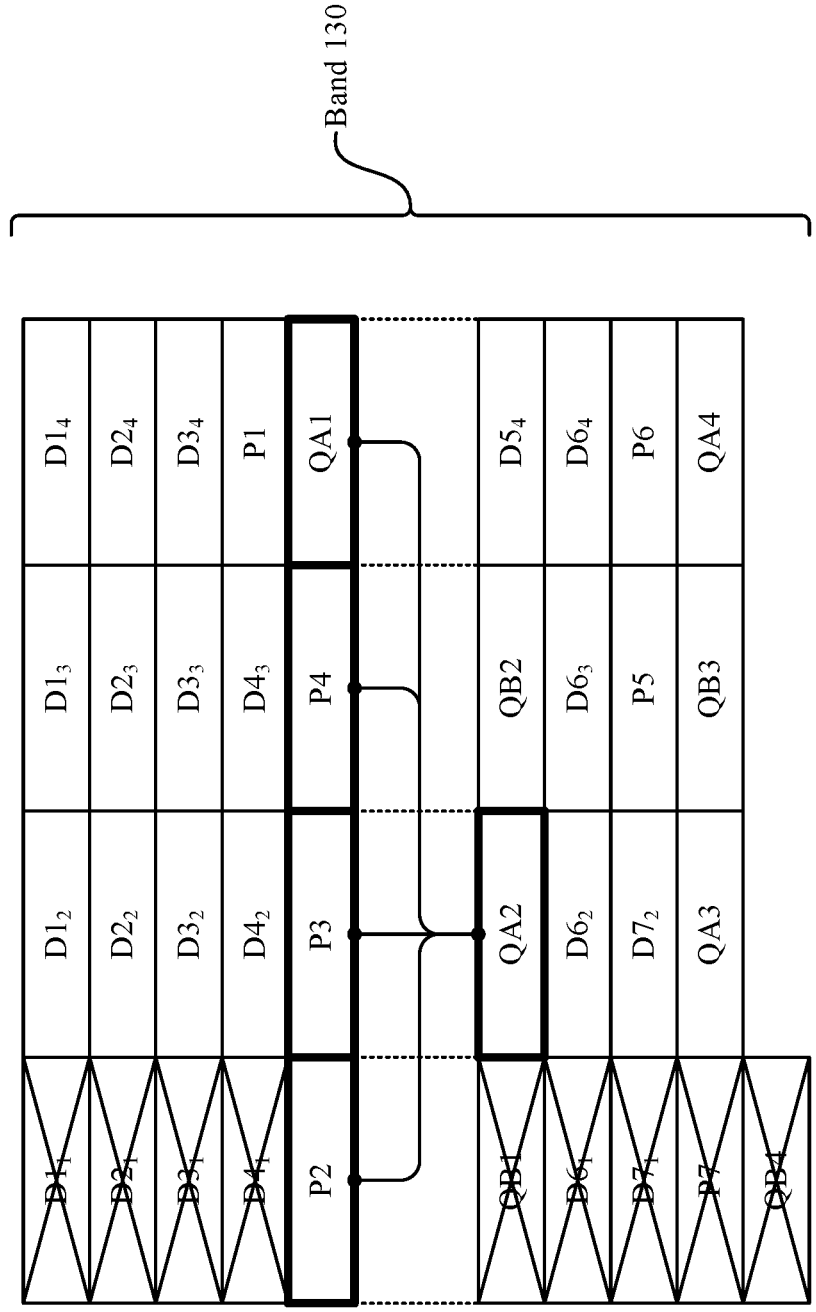

Accordingly, a third step in FIG. 2C involves recovering the primary parity page 136 "P2". As previously set forth herein, the secondary parity page 136 "QA2" represents the exclusive disjunction (XOR) of the primary parity pages 136 "P2", "P3", and "P4" and the second parity page 136 "QA1". In this regard, even though the primary parity page 136 "P2" is unavailable (due to the failure of the die 132-1), the primary parity page 136 "P2" can nonetheless be recovered using (1) the secondary parity page 136 "QA2", and (2) the primary parity pages 136 "P3" and "P4" and secondary parity page 136 "QA1". This notion is illustrated in FIG. 2C by way of the directional arrows, which indicate that the combination of the aforementioned primary/secondary parity pages 136 can be utilized to recover the primary parity page 136 "P2". It is noted that the recovered primary parity page 136 "P2" is illustrated within the same position for the purpose of simplicity, and that those having skill in the art will appreciate that the recovered primary parity page 136 "P2" will be stored in another location (as the die 132-1 is not functional). In any case, with the primary parity page 136 "P2" recovered, the recovery procedure can advance to a following step that involves recovering the primary parity page 136 "P7", which is described below in greater detail.

Figure 2D:
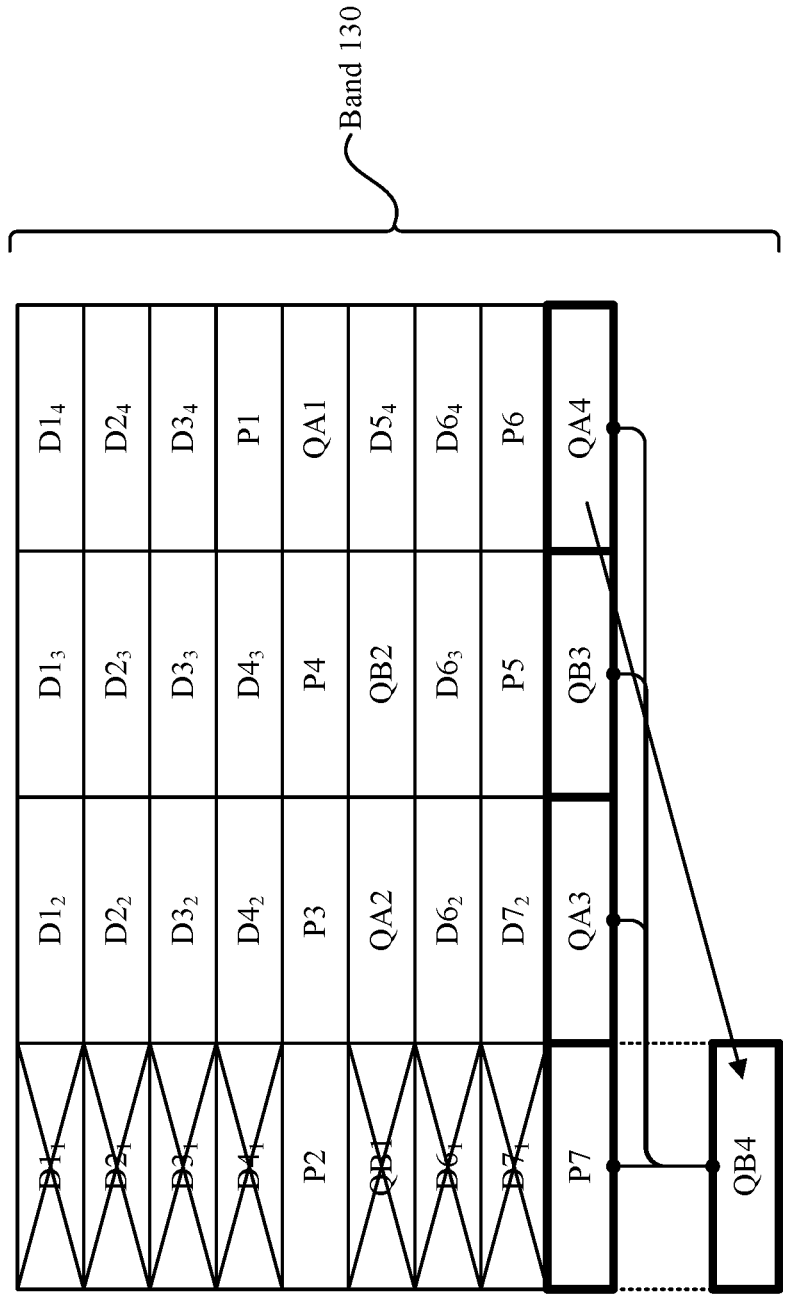

Turning now to FIG. 2D, a fourth step involves recovering the primary parity page 136 "P7". In particular, and as previously noted herein, the secondary parity page 136 "QA4" represents the exclusive disjunction (XOR) of the primary parity page 136 "P7", and secondary parity page "QA3", "QB3", and "QA4". Secondary parity page 136 "QB4" is a copy of secondary parity page "QA4". It can be desirable to use secondary parity page 136 "QB4" to recover the primary parity page 136 "P7" since the secondary parity page "QA4" is included in the same stripe 134 with the primary parity page "P7". However, secondary parity page 136 "QB4" is unavailable due to die 132-1 failing. As previously described herein, there exists a copy for each secondary parity page 136, where the copy resides on a die 132 that is distinct from the die 132 on which the secondary parity page 136 resides. To recover secondary parity page "QB4", the secondary parity page 136 "QA4" can be copied to secondary parity page "QA4", the notion of which is illustrated in FIG. 2D by way of the directional arrow. In this regard, even though the primary parity page 136 "P7" is unavailable (due to the failure of the die 132-1), the primary parity page 136 "P7" can nonetheless be recovered using (1) the (recovered) secondary parity page 136 "QB4", and (2) the secondary parity pages 136 "QA3", "QB3", and "QA4", the notion of which is illustrated in FIG. 2D by way of the directional arrows. In any case, it is noted that the recovered primary parity page 136 "P7" is illustrated within the same position for the purpose of simplicity, and that those having skill in the art will appreciate that the recovered primary parity page 136 "P7" will be stored in another location (as the die 132-1 is not functional). In any case, with the primary parity page 136 "P7" recovered, the recovery procedure can advance to subsequent steps that involve recovering each of the data pages 136 ($D1_1$, $D2_1$, $D3_1$, $D4_1$, $D6_1$, and $D7_1$), which is described below in greater detail.

Figure 2E:
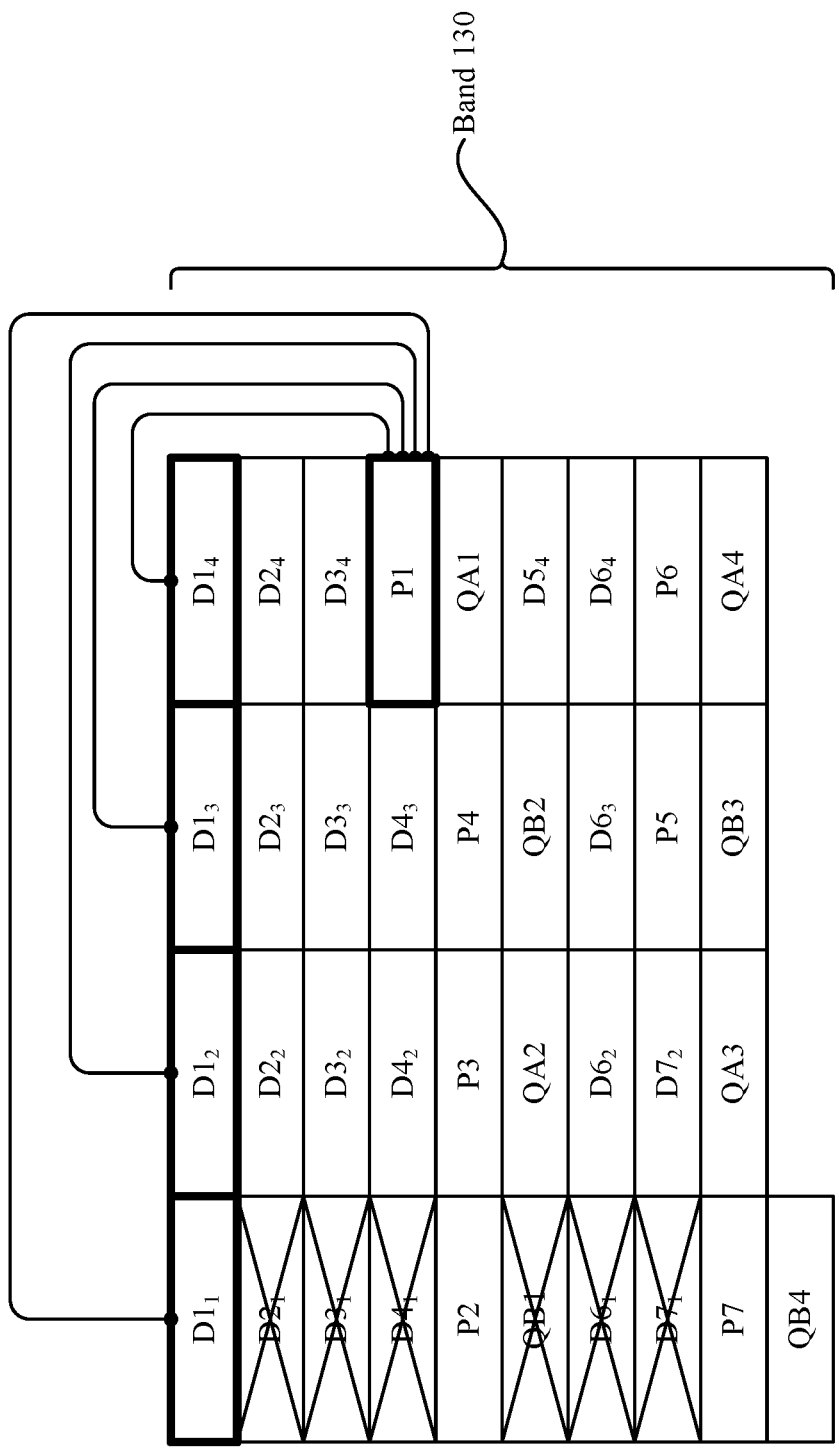
Figure 2F:
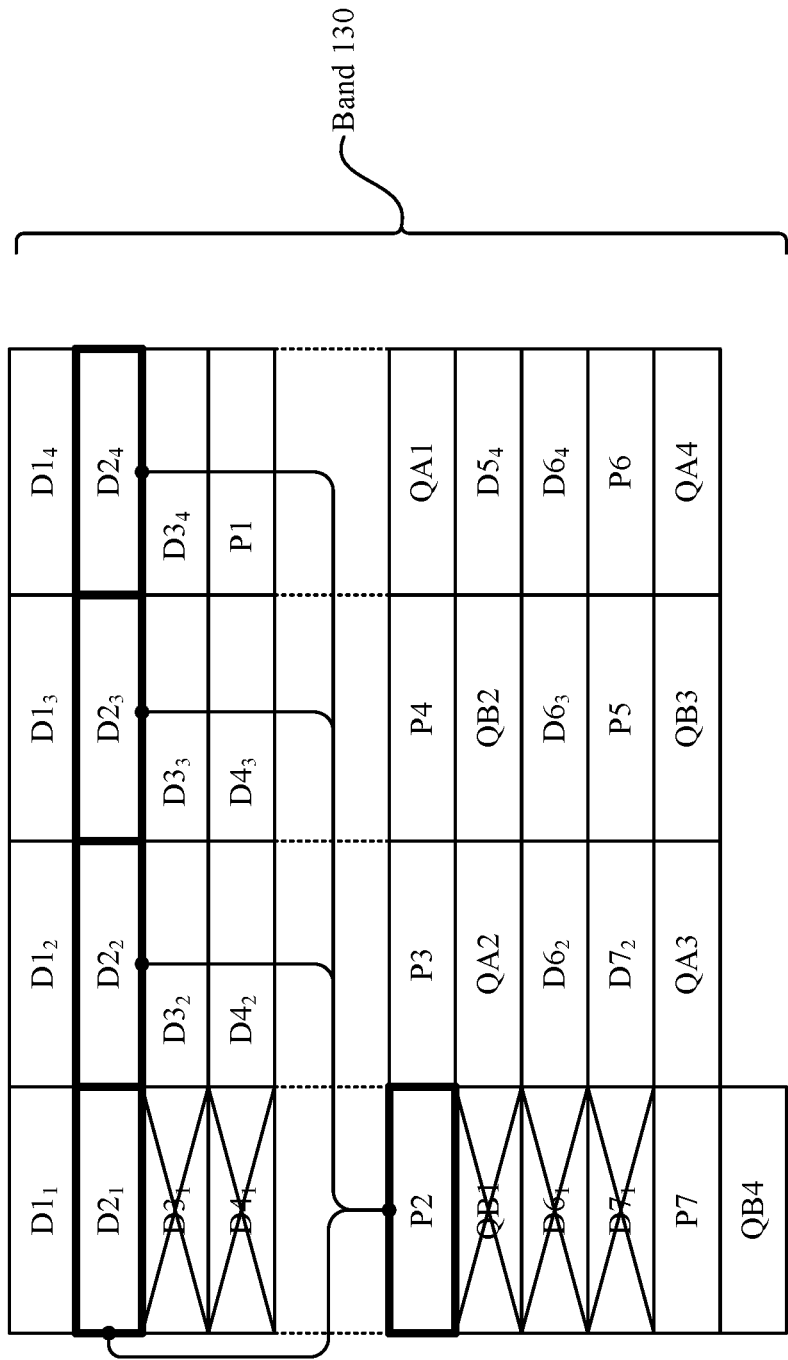
Figure 2G:
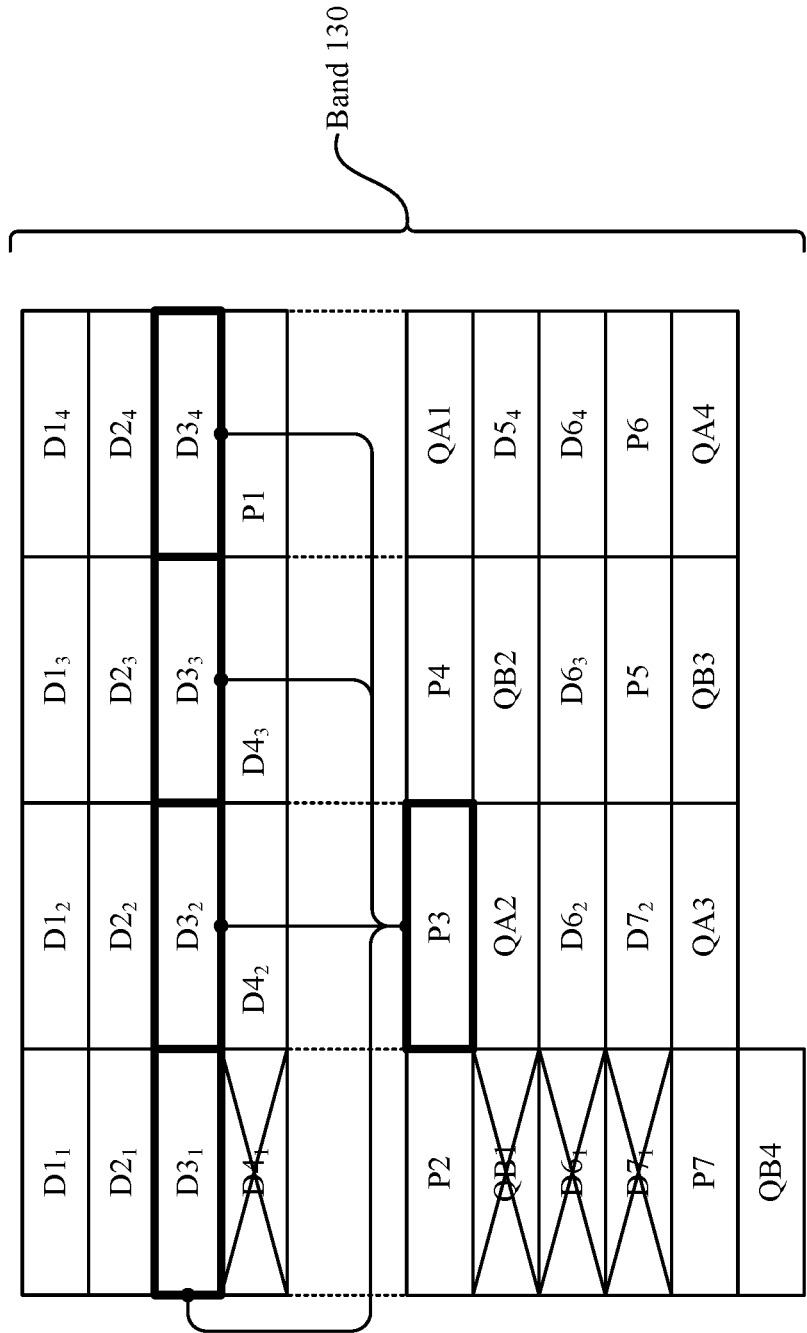
Figure 2H:
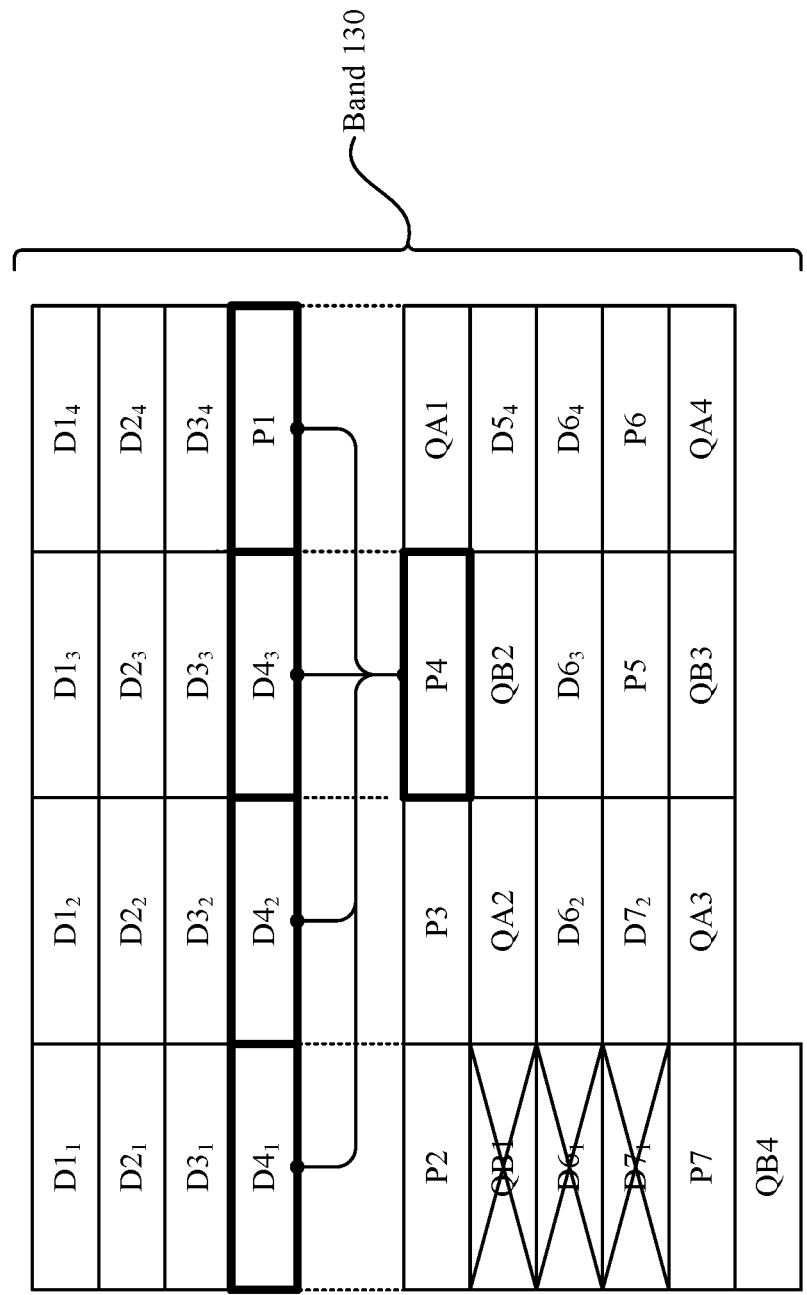
Figure 2I:
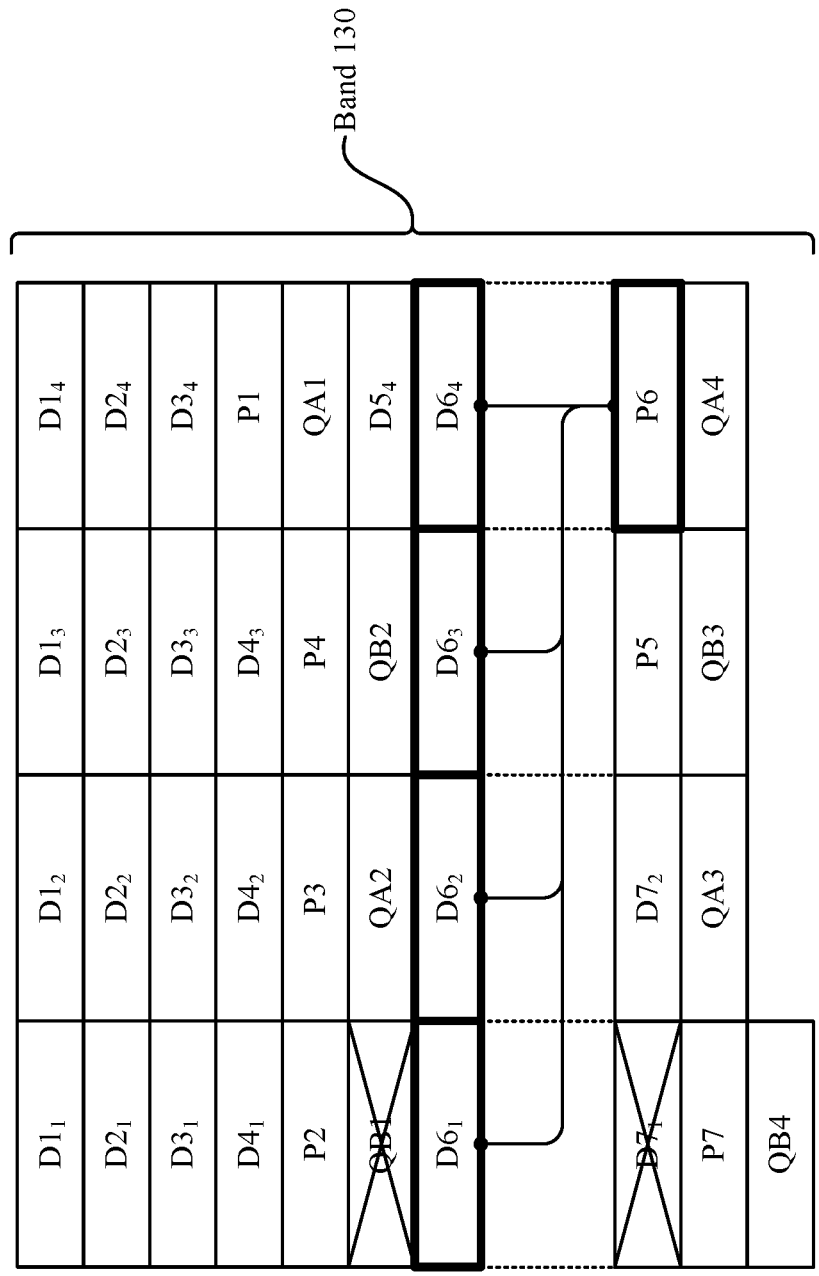

Turning now to FIG. 2E, a fifth step involves recovering the data page 136 "$D1_1$" included in the first stripe 134 of the band 130. In particular, and as previously noted herein, the primary parity page 136 "P1" represents the exclusive disjunction (XOR) of the data pages 136 ($D1_1$, $D1_2$, $D1_3$, and $D1_4$). In this regard, even though the data page 136 "$D1_1$" is unavailable (due to the failure of the die 132-1), the data page 136 "$D1_1$" can nonetheless be recovered using (1) the primary parity page 136 "P1", and (2) the data pages 136 ($D1_2$, $D1_3$, and $D1_4$). This notion is illustrated in FIG. 2E by way of the directional arrows, which indicate that the combination of the aforementioned data/primary parity pages 136 can be utilized to recover the data page 136 "$D1_1$". It is noted that the recovered data page 136 "$D1_1$" is illustrated within the same position for the purpose of simplicity, and that those having skill in the art will appreciate that the recovered data page 136 "$D1_1$" will be stored in another location (as the die 132-1 is not functional). In any case, with the data page 136 "$D1_1$" recovered, the recovery procedure can advance to additional sixth (FIG. 2F), seventh (FIG. 2G), eighth (FIG. 2H), ninth (FIG. 2I), and tenth (FIG. 2J) steps that involve recovering the data pages 136 ($D2_1$, $D3_1$, $D4_1$, $D6_1$, $D7_1$) using the appropriate corresponding data pages 136/primary parity pages 136.

Figure 2J:
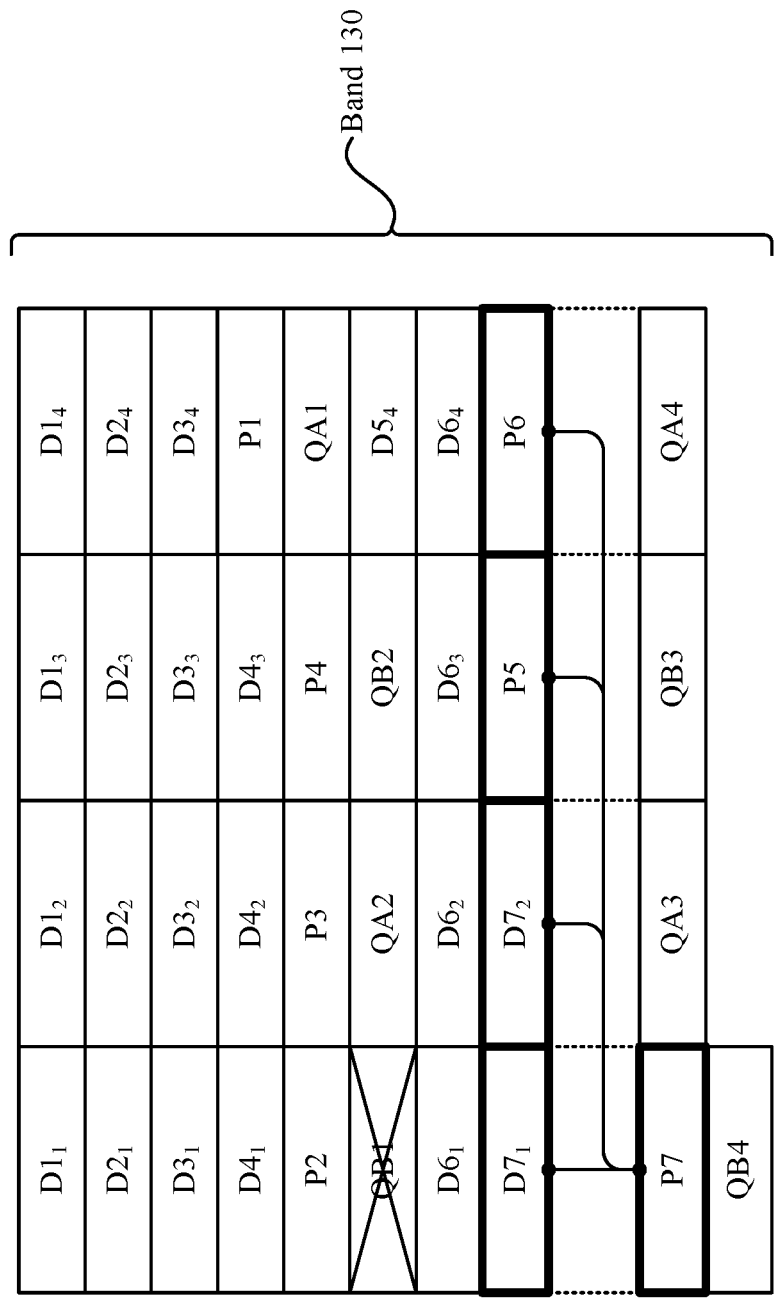
Figure 2K:
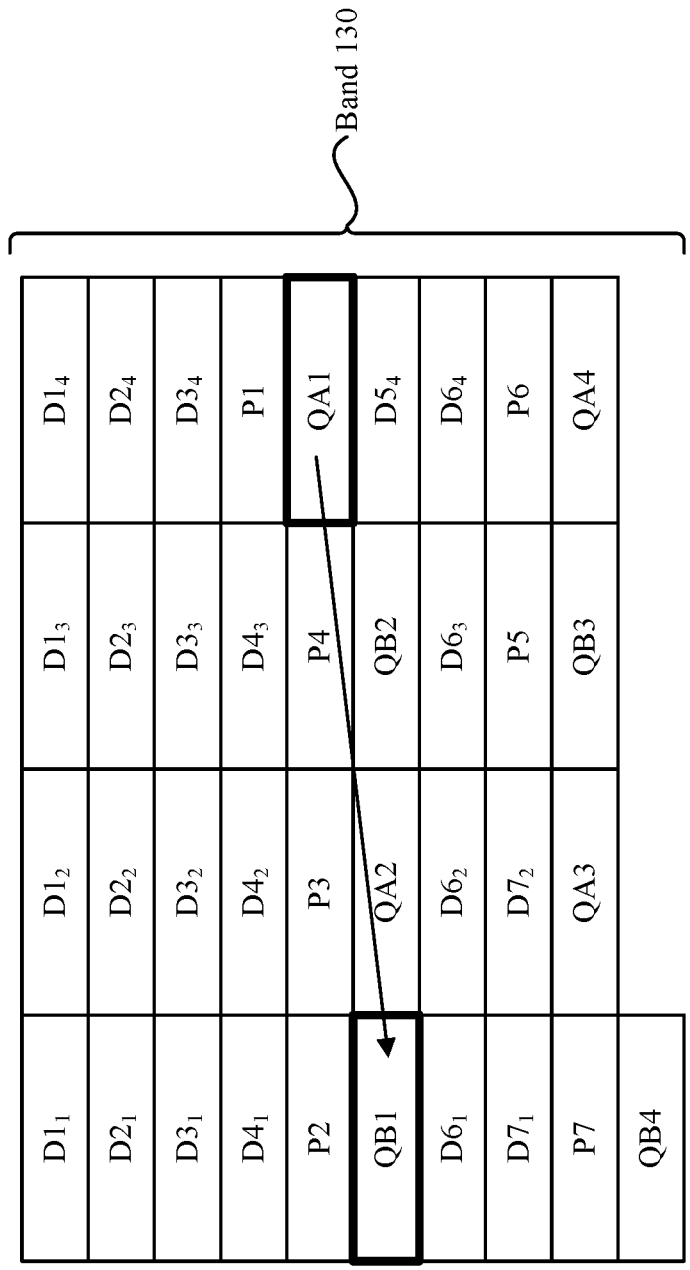

Accordingly, at the conclusion of the tenth step of FIG. 2J, each of the data pages 136 "$D1_1$", "$D2_1$", "$D3_1$", "$D4_1$", "$D6_1$", and "$D7_1$" have been effectively restored. At this juncture, additional steps can be taken to recover additional lost pages 136, including the secondary parity page 136 "QB1". In particular, an eleventh step in FIG. 2K involves recovering the secondary parity page 136 "QB1", where the secondary parity page 136 "QB1" represents a copy of the secondary parity page 136 "QA1". In this regard, even though the secondary parity page 136 "QB1" is unavailable (due to the failure of the die 132-1), the secondary primary page 136 "QB1" can nonetheless be recovered using the secondary parity page 136 "QA1". This notion is illustrated in FIG. 2K by way of the directional arrow, which indicate that the contents of the secondary parity page 136 "QA1" have been copied to the secondary parity page 136 "QB1". Again, it is noted that the recovered secondary parity page 136 "QB1" is illustrated within the same position for the purpose of simplicity, and that those having skill in the art will appreciate that the recovered secondary parity page 136 "QB1" will be stored in another location (as the die 132-1 is not functional).

Figure 2L:
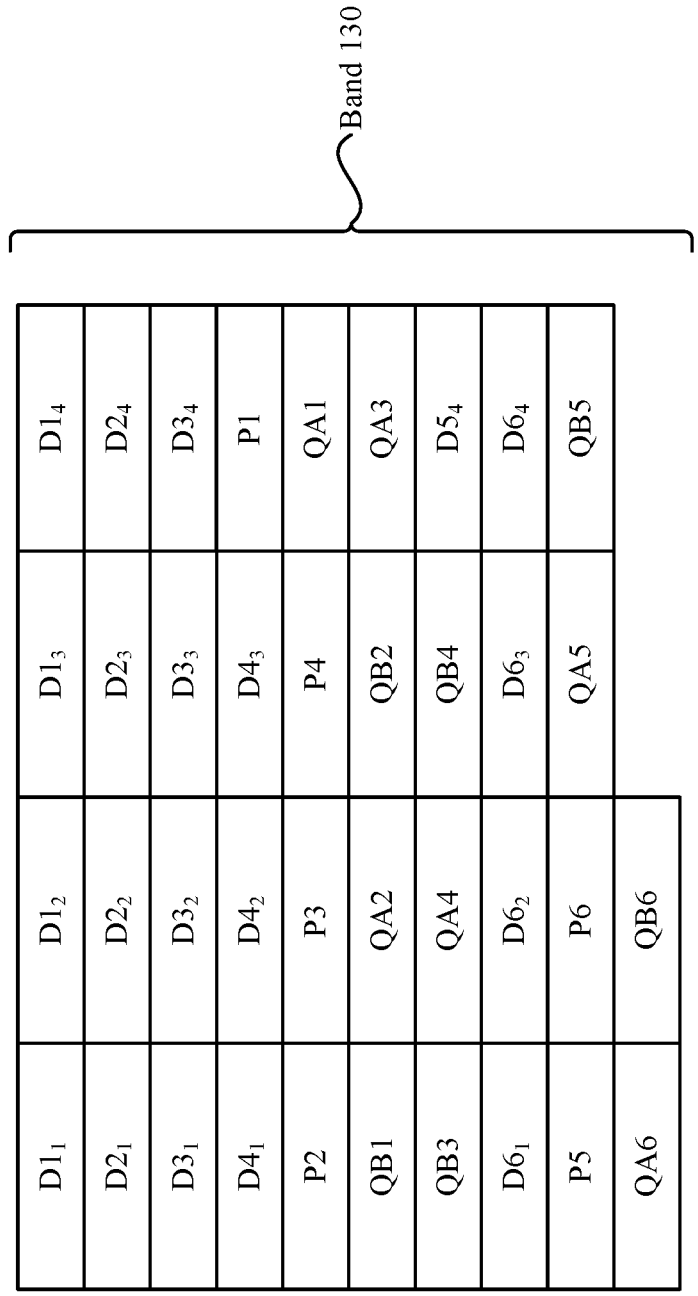

Accordingly, at the conclusion of the eleventh step of FIG. 2K, the example scenario can transition to a twelfth step illustrated in FIG. 2L, which represents the outcome of the recovery procedure described in conjunction with FIGS. 2A-2K. In particular, and as shown in FIG. 2L, all of the data pages 136, primary parity pages 136, and secondary parity pages 136 have been effectively recovered, despite the die 132-1 failure. Again, it is noted that these recovered pages are illustrated in their original positions (i.e., within the die 132-1) for the purpose of simplicity, and that these recovered pages will be relocated into functioning dies 132 of the non-volatile memory 118. In any case, the robust recovery procedures described herein can be effectively carried out due to the manner in which the data pages 136/primary parity pages 136/secondary parity pages 136 are distributed throughout the different stripes 134 of the band 130. More particularly, placing the parity data next to its corresponding user data by appending the parity data to its corresponding user data in the band 130 can enhance the speed at which the parity data is obtained in the recover procedure. This is due to the deterministic nature of the location of the parity data without the use of a pointer between the user data and the parity data.

Figure 2M:
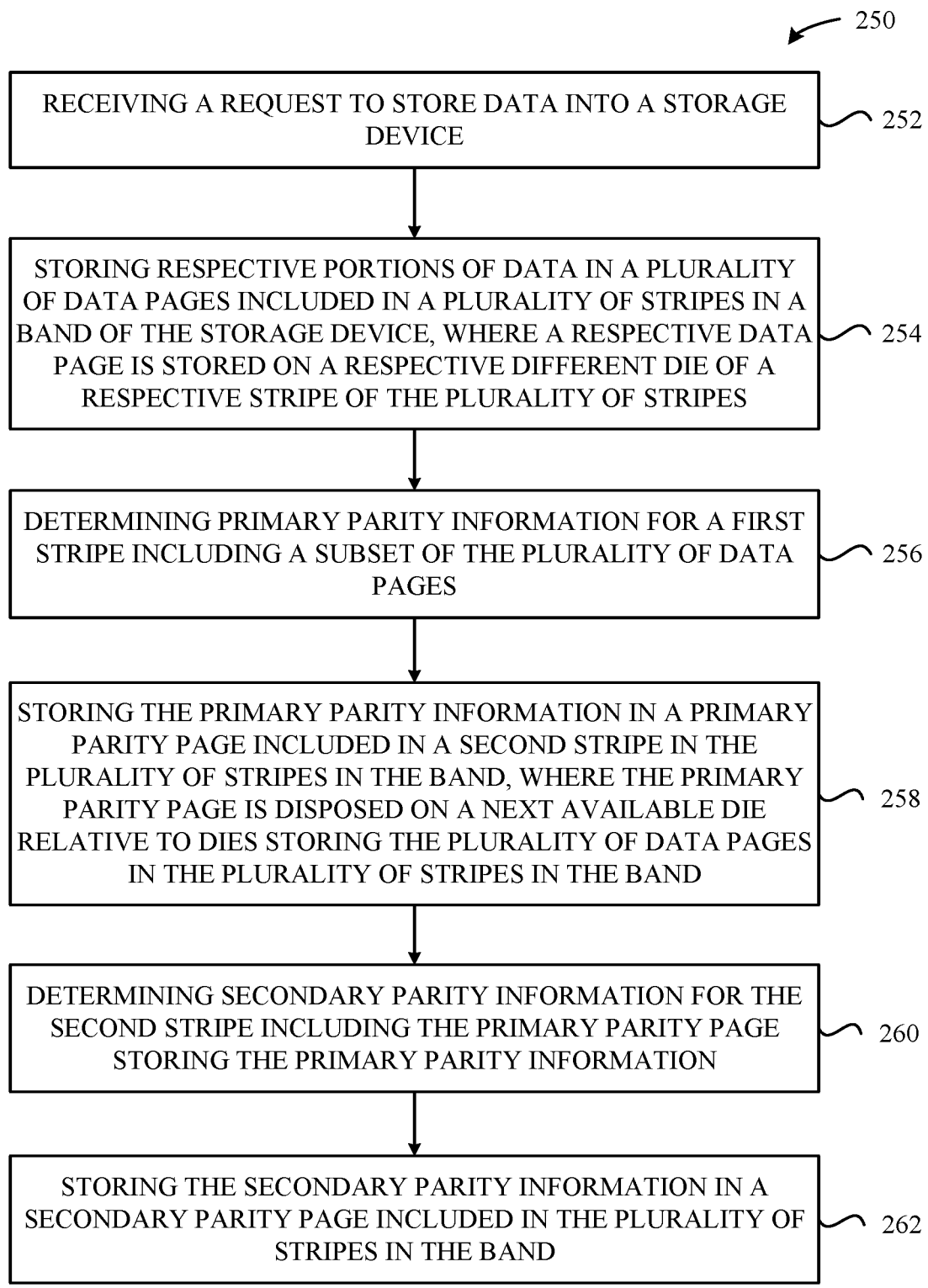
FIG. 2M illustrates a method that involves establishing parity information in accordance with a write request that is received by a storage device, according to some embodiments.

Accordingly, to provide additional context to the data/parity information distribution techniques described herein, FIG. 2M illustrates a method 250 that involves establishing data pages 136/primary parity pages 136/secondary parity pages 136 in accordance with a write request that is received by the storage device 112, according to some embodiments. In particular, and as shown in FIG. 2M, the method 250 begins at step 252, where the controller 114 receives a request to store data into the storage device 112. For example, the request can be issued by an application 110/the OS 108 in conjunction with a user creating a data object (e.g., a file) on the computing device 102. In another example, the request can be issued in conjunction with a user modifying an existing data object.

At step 254, the controller 114 stores the data in a plurality of data pages 136 included in a plurality of stripes 134 in a band 130 of the storage device 112, where a respective data page 136 is stored on a respective different die 132 of a respective stripe 134 of the plurality of stripes 134. In this regard, the stripes 134 including the data pages 136 can be included in a band 130, e.g., the band 130 described above in conjunction with FIGS. 2A-2L. At step 256, the controller 114 determines primary parity information for a first stripe 134 including a subset of the plurality of data pages (e.g., "D1$_1$", "D1$_2$", "D1$_3$", "D1$_4$"). This can involve, for example, calculating the exclusive disjunction (XOR) of the data pages 136 included in the first stripe 134. In another example, the primary parity information is determined or generated using one or more XOR gates in a logic circuit that input the data pages 136 included in the first stripe 134. It is noted that the execution of step 256 can be delayed according to a variety of factors to help improve the overall efficiency of the techniques set forth herein. For example, step 256 can be executed in response to identifying that a threshold number of data pages 136 are stored in the first stripe such that the first stripe is completely written.

In any case, at step 258, the controller 114 stores the primary parity information in a primary parity page 136 included in a second stripe 134 of the storage device 112. However, it is noted that the primary parity information can be stored in two or more primary parity pages 136 without departing from the scope of this disclosure. In any case, the second stripe 134 can be included in the same band 130 in which the user data is included. In some embodiments, the second stripe includes a second subset of the plurality of data pages 136 (e.g., "D4$_1$", "D4$_2$", "D4$_3$" in FIG. 2A), and each of the second subset of the plurality of data pages 136 and the primary parity page 136 is stored on a respective different die 132 of the storage device 112. For example, in FIG. 2A, the second stripe 134 storing the primary parity page 136 "P1" also stores data pages 136 "D4$_1$", "D4$_2$", "D4$_3$".

Moreover, the primary parity page 136 can be disposed on a next available die 132 relative to dies 132 storing the plurality of data pages 136 in the plurality of stripes 134 in the band. The controller 114 can determine the next available die at which to store the primary page 136 based on a number of the plurality of data pages 136 that are storing the respective portions of data. This deterministic capability of locating the parity information can provide the benefit of faster lookup and storage of the parity data. As depicted in FIG. 2A, primary parity page 136 "P1" is disposed on the next available die 132-4 relative to dies storing the plurality of data pages 136. That is, the last written data page 136 "D4$_3$" is disposed on die 132-3 and the next available die relative to die 132-3 is die 132-4. In other words, the primary parity data is appended to user data at a page 136 on a die that includes an address immediately subsequent to the location of the die storing the last written data page 136 (e.g., "D4$_3$").

Further, the controller 114 can determine second primary parity information (e.g., "P2" in FIG. 2A) for a third stripe 134 of the plurality of stripes 134, where the third stripe 134 includes a second subset of the plurality of data pages 136 (e.g., data pages "D2$_1$", "D2$_2$", "D2$_3$", "D2$_4$" in FIG. 2A). The controller 114 can store the second primary parity information for the third stripe into a second primary parity page included in the plurality of stripes 134 in the band 130, where the second primary parity page is disposed on another next available die (e.g., 132-1) relative to the next available die (e.g., 132-4) storing the primary parity page (e.g., "P1"). This process can continue until primary parity information for each stripe 134 including data pages 136 is stored in primary parity pages in the band 130 by sequentially appending the primary parity pages 136 at next available dies 132.

At step 260, the controller 114 determines secondary parity information for the second stripe 134 including the primary parity page 136 storing the primary parity information. This can involve, for example, calculating the exclusive disjunction (XOR) of the primary parity page 136 included in the second stripe 134, as well as any other primary parity pages 136 included in the second stripe 134 and/or any other data pages 136 included in the second stripe 134. In another example, the primary parity information is determined or generated using one or more XOR gates in a logic circuit that input the primary parity page 136 included in the second stripe 134, as well as any other primary parity pages 136 includes in the second stripe 134 and/or any other data pages 136 included in the second stripe 134. Again, it is noted that the parity information calculation techniques described herein are not limited to exclusive disjunction (XOR) implementations, and that any approach can be used to calculate, determine, or generate the parity information. Additionally, it is noted that the execution of step 260 can be delayed according to a variety of factors to help improve the overall efficiency of the techniques set forth herein. For example, step 260 be executed in response to identifying that a threshold number of primary parity pages 136 are stored in the second stripe such that the second stripe is completely written.

In any case, at step 262, the controller 114 stores the secondary parity information in a secondary parity page 136 included in the plurality of stripes 134 in the band 130. However, it is noted that the secondary parity information can be stored in two or more secondary parity pages 136 without departing from the scope of this disclosure. In any case, the second parity page 136 can be disposed on another next available die 132 relative to the last die 132 on which the last primary parity page 136 was disposed. In other words, the secondary parity page 136 (e.g., "QA1" of FIG. 2A) is appended to a page 136 on a die (e.g., 132-4 of FIG. 2A) that includes an address immediately subsequent to the location of the die (e.g., 132-3 of FIG. 2A) storing the last written primary parity page 136 (e.g., "P4" of FIG. 2A). The second parity page 136 can be written into a third stripe 134 of the plurality of stripes 134 in the band 130. The third stripe 134 can include data pages 136, primary parity pages 136, and/or other second parity pages 136.

Next, the controller 114 can store a copy of the secondary parity page 136 in a different secondary parity page 136 included in the band 130, where the different secondary parity page 136 is stored on a different die 132 than the respective die 132 on which the secondary parity page 136 is stored. The secondary parity page 136 and the copy of the secondary parity page 136 can be stored on the same or different stripe 134. As depicted in FIG. 2A, secondary parity page 136 "QA1" is stored on one stripe 134 and the secondary parity page copy 136 ("QB1") are stored on separate stripes 134 within the same band 130. Notably, scenarios that involve utilizing multiple secondary parity pages 136 to represent the secondary parity information would involve establishing multiple corresponding copies as well. In any case, various data pages 136/primary parity pages 136/secondary parity pages 136 are stored in the same band 130 of the non-volatile memory 118 in response to the write request that is received at step 252.

In some embodiments, the controller 114 can receive a second request to store second data into the storage device 112. For example, the second request can be issued by an application 110/the OS 108 in conjunction with a user creating a data object (e.g., a file) on the computing device 102. In another example, the request can be issued in conjunction with a user modifying an existing data object.

In any case, the controller 114 can determine a data storage size for the second data pages 136 for the second data, second primary parity pages 136 for the second data pages 136, and second secondary parity pages 136 for the second primary parity pages 136, and second secondary parity page copies 136 for the second secondary parity pages 136. As previously noted, the number of primary parity pages 136 can be determined based on the stripes 134/pages 136 needed to store the data pages 136 for the user data. Further, the secondary parity pages 136 can be determined based on the number of stripes 134 storing the primary parity pages 136. The secondary parity page copies 136 can be determined based on the number of the secondary parity pages 136. For example, each secondary parity page 136 can cause a copy of the secondary parity page 136 to be established.

The controller 114 can determine a second size of available space in the band 130 of the storage device 112. Responsive to determining that the size is less than or equal to the second size, the controller 114 can store the second data pages 136, the second primary parity pages 136, the second secondary parity pages 136, and the second secondary parity page copies 136 in the band 130. The second data pages 136 (e.g., the second set in FIG. 2A) can be appended to the copy of the last secondary parity page 136 for the previously stored parity data corresponding to the previously stored user data (e.g., the first set in FIG. 2A). The second primary parity pages 136 can be appended to the second data pages 136, and the secondary primary pages 136 and secondary primary page copies 136 can be appended to the second primary parity pages 136 in the band 130.

Responsive to determining that the size exceeds the second size, the controller 114 can store the second data pages 136, the second primary pages 136, the second secondary parity pages 136, and the second secondary parity page copies 136 in a second band 130 of the storage device 112. In such an instance, the second data pages 136, the second primary pages 136, the second secondary parity pages 136, and the second secondary parity page copies 136 can be stored at a beginning page/stripe of the second band 130, assuming there is no other user data and parity data stored in the second band 130.

Figure 3:
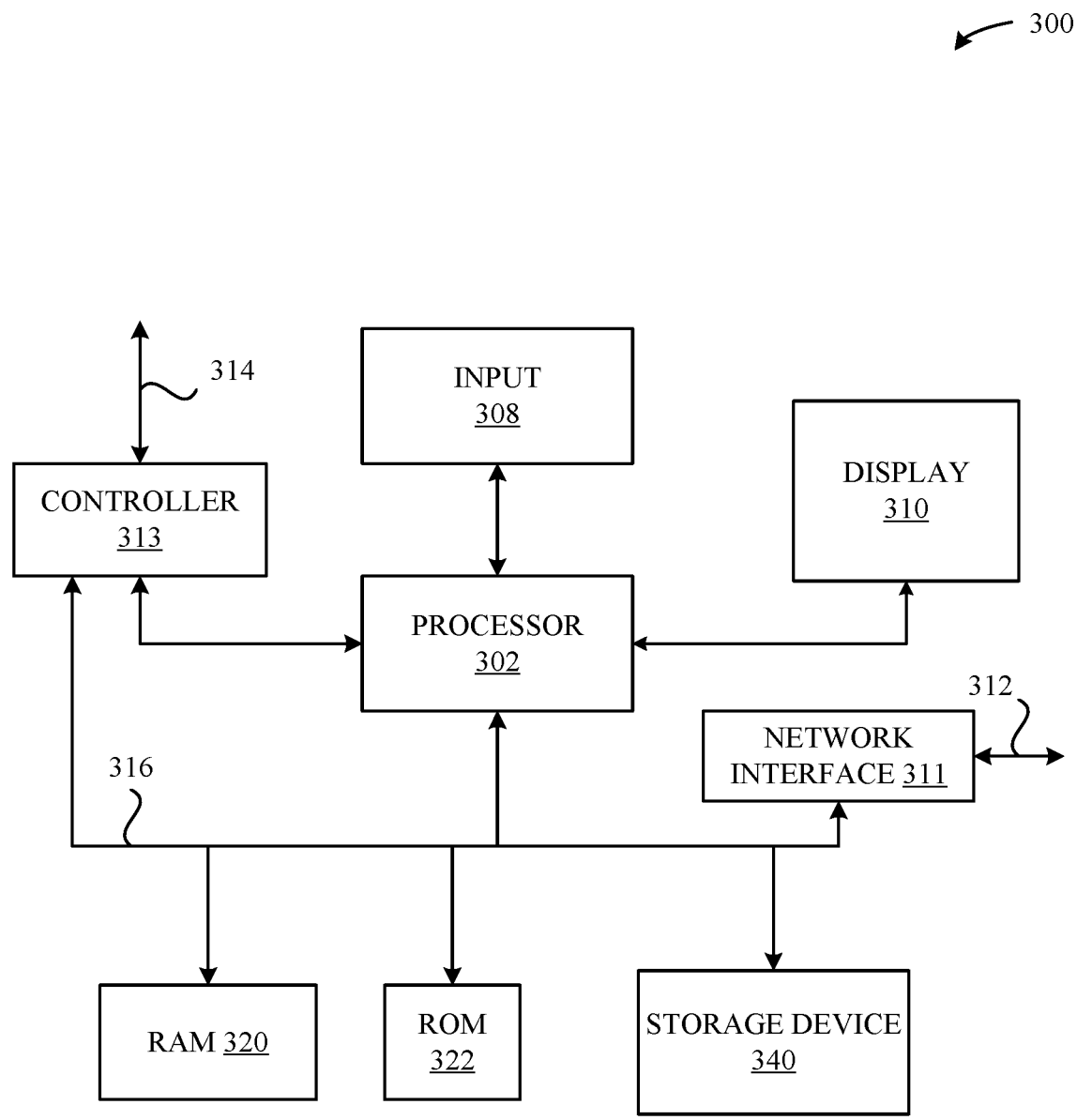
FIG. 3 illustrates a detailed view of a computing device that can be used to implement the various components described herein, according to some embodiments.

FIG. 3 illustrates a detailed view of a computing device 300 that can represent the computing devices of FIG. 1 used to implement the various techniques described herein, according to some embodiments. For example, the detailed view illustrates various components that can be included in the computing device 102 described in conjunction with FIG. 1. As shown in FIG. 3, the computing device 300 can include a processor 302 that represents a microprocessor or controller for controlling the overall operation of the computing device 300. The computing device 300 can also include a user input device 308 that allows a user of the computing device 300 to interact with the computing device 300. For example, the user input device 308 can take a variety of forms, such as a button, keypad, dial, touch screen, audio input interface, visual/image capture input interface, input in the form of sensor data, and so on. Still further, the computing device 300 can include a display 310 that can be controlled by the processor 302 (e.g., via a graphics component) to display information to the user. A data bus 316 can facilitate data transfer between at least a storage device 340, the processor 302, and a controller 313. The controller 313 can be used to interface with and control different equipment through an equipment control bus 314. The computing device 300 can also include a network/bus interface 311 that couples to a data link 312. In the case of a wireless connection, the network/bus interface 311 can include a wireless transceiver.

As noted above, the computing device 300 also includes the storage device 340, which can comprise a single disk or a collection of disks (e.g., hard drives). In some embodiments, storage device 340 can include flash memory, semi-conductor (solid state) memory or the like. The computing device 300 can also include a Random-Access Memory (RAM) 320 and a Read-Only Memory (ROM) 322. The ROM 322 can store programs, utilities or processes to be executed in a non-volatile manner. The RAM 320 can provide volatile data storage, and stores instructions related to the operation of applications executing on the computing device 300.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing parity information for data stored on a non-volatile storage device, the method comprising, at a computing device that has access to the non-volatile storage device:
   receiving a request to store the data into the non-volatile storage device;
   storing respective portions of the data in a plurality of data pages included in a plurality of stripes in a band of the non-volatile storage device, wherein a respective data page is stored on a respective different die of a respective stripe of the plurality of stripes;
   determining primary parity information for a first stripe including a subset of the plurality of data pages;
   storing the primary parity information for the first stripe in a primary parity page included in a second stripe in the plurality of stripes in the band, the primary parity page being stored on a die that is a next available die in the band, the next available die being relative to dies storing the plurality of data pages in the plurality of stripes in the band, and the first and second stripes are distinct from one another;
   determining secondary parity information for the second stripe including the primary parity page storing the primary parity information;
   storing the secondary parity information in a secondary parity page included in the plurality of stripes in the band;
   determining second primary parity information for a third stripe of the plurality of stripes, wherein the third stripe includes a second subset of the plurality of data pages; and
   storing the second primary parity information in a second primary parity page included in the plurality of stripes in the band, wherein the second primary parity page is stored on another next available die relative to the next available die storing the primary parity page in the plurality of stripes.

2. The method of claim 1, wherein the second stripe includes a second subset of the plurality of data pages and the primary parity page, and each of the second subset of the plurality of data pages and the primary parity page is stored on another respective different die of the non-volatile storage device.

3. The method of claim 1, wherein the secondary parity page is stored on another next available die relative to the next available die storing the primary parity page in the plurality of stripes.

4. The method of claim 3, comprising storing a copy of the secondary parity page in a different secondary parity page included in the plurality of stripes in the band.

5. The method of claim 4, wherein the different secondary parity page is stored on a different die than the another next available die on which the secondary parity page is stored.

6. The method of claim 4, wherein the secondary parity page and the different secondary parity page are stored in a third stripe of the plurality of stripes in the band.

7. The method of claim 1, comprising determining the next available die at which to store the primary parity page based on a number of the plurality of data pages that are storing the respective portions of the data.

8. The method of claim 1, further comprising:
   receiving a second request to store second data into the non-volatile storage device;
   determining a data storage size for second data pages for the second data, second primary parity pages for the second data pages, and second secondary parity pages for the second primary parity pages, and second secondary parity page copies for the second secondary parity pages;
   determining a second size of available space in the band of the non-volatile storage device;
   responsive to determining that the data storage size is less than or equal to the second size, storing the second data pages, the second primary parity pages, the second secondary parity pages, and the second secondary parity page copies in the band; and
   responsive to determining that the data storage size exceeds the second size, storing the second data pages, the second primary parity pages, the second secondary parity pages, and the second secondary parity page copies in a second band of the non-volatile storage device.

9. At least one non-transitory computer readable storage medium configured to store instructions that, when executed by at least one processor included in a computing device, cause the computing device to manage parity information for data stored on a non-volatile storage device that is accessible to the computing device, by carrying out steps that include:
   receiving a request to store the data into the non-volatile storage device;
   storing respective portions of the data in a plurality of data pages included in a plurality of stripes in a band of the non-volatile storage device, wherein a respective data page is stored on a respective different die of a respective stripe of the plurality of stripes;
   determining primary parity information for a first stripe including a subset of the plurality of data pages;
   storing the primary parity information for the first stripe in a primary parity page included in a second stripe in the plurality of stripes in the band, the primary parity page being stored on a die that is a next available die in the band, the next available die being relative to dies storing the plurality of data pages in the plurality of stripes in the band, and the first and second stripes are distinct from one another;
   determining secondary parity information for the second stripe including the primary parity page storing the primary parity information;
   storing the secondary parity information in a secondary parity page included in the plurality of stripes in the band;

determining second primary parity information for a third stripe of the plurality of stripes, wherein the third stripe includes a second subset of the plurality of data pages; and storing the second primary parity information in a second primary parity page included in the plurality of stripes in the band, wherein the second primary parity page is stored on another next available die relative to the next available die storing the primary parity page in the plurality of stripes.

10. The at least one non-transitory computer readable storage medium of claim 9, wherein the second stripe includes a third subset of the plurality of data pages and the primary parity page, and each of the third subset of the plurality of data pages and the primary parity page is stored on another respective different die of the non-volatile storage device.

11. The at least one non-transitory computer readable storage medium of claim 9, wherein the steps further include:

storing a copy of the secondary parity page in a different secondary parity page included in the plurality of stripes in the band.

12. The at least one non-transitory computer readable storage medium of claim 11, wherein the different secondary parity page is stored on a different die than the another next available die on which the secondary parity page is stored.

13. The at least one non-transitory computer readable storage medium of claim 11, wherein the secondary parity page and the different secondary parity page are stored in the third stripe of the plurality of stripes in the band.

14. The at least one non-transitory computer readable storage medium of claim 13, wherein the third stripe includes a plurality of secondary parity pages in which the secondary parity page is included, and each secondary parity page of the plurality of secondary parity pages is stored on a respective different die of the non-volatile storage device.

15. A computing device configured to manage managing parity information for data stored on a non-volatile storage device that is accessible to the computing device, the computing device comprising:

at least one processor; and at least one memory storing instructions that, when executed by the at least one processor, cause the computing device to:

receive a request to store the data into the non-volatile storage device;

store respective portions of the data in a plurality of data pages included in a plurality of stripes in a band of the non-volatile storage device, wherein a respective data page is stored on a respective different die of a respective stripe of the plurality of stripes;

determine primary parity information for a first stripe including a subset of the plurality of data pages;

store the primary parity information for the first stripe in a primary parity page included in a second stripe in the plurality of stripes in the band, the primary parity page being stored on a die that is a next available die in the band, the next available die being relative to dies storing the plurality of data pages in the plurality of stripes in the band, and the first and second stripes are distinct from one another;

determine secondary parity information for the second stripe including the primary parity page storing the primary parity information;

store the secondary parity information in a secondary parity page included in the plurality of stripes in the band;

determine second primary parity information for a third stripe of the plurality of stripes, wherein the third stripe includes a second subset of the plurality of data pages; and store the second primary parity information in a second primary parity page included in the plurality of stripes in the band, wherein the second primary parity page is stored on another next available die relative to the next available die storing the primary parity page in the plurality of stripes.

16. The computing device of claim 15, wherein the second stripe includes a third subset of the plurality of data pages and the primary parity page, and each of the third subset of the plurality of data pages and the primary parity page is stored on another respective different die of the non-volatile storage device.

17. The computing device of claim 15, wherein the secondary parity page is stored on another next available die relative to the next available die storing the primary parity page in the plurality of stripes.

18. The computing device of claim 17, wherein the at least one processor further causes the computing device to:

store a copy of the secondary parity page in a different secondary parity page included in the plurality of stripes in the band.

\* \* \* \* \*